Aug. 29, 1967   W. SMITKA   3,339,205
UTILIZING SEGMENTED DIPOLE ELEMENTS TO DECREASE INTERACTION
BETWEEN ACTIVATED AND DEACTIVATED ANTENNAS
Filed March 9, 1964   2 Sheets-Sheet 1

EQUIVALENT CIRCUIT FOR "−" BIAS

EQUIVALENT CIRCUIT FOR "+" BIAS

INVENTOR
WOLFGANG SMITKA

BY *Percy P. Lantly*
ATTORNEY

United States Patent Office 3,339,205
Patented Aug. 29, 1967

3,339,205
UTILIZING SEGMENTED DIPOLE ELEMENTS TO DECREASE INTERACTION BETWEEN ACTIVATED AND DEACTIVATED ANTENNAS
Wolfgang Smitka, Pforzheim, Germany, assignor to International Standard Electric Corporation, New York, N.Y., a corporation of Delaware
Filed Mar. 9, 1964, Ser. No. 350,223
Claims priority, application Germany, June 29, 1963, St 20,800
8 Claims. (Cl. 343—701)

In many direction finding or radio beacon systems operating on the Doppler principle, circular or linear antenna arrays are used, consisting of a multitude of dipole antennae, the dipoles being cyclically and successively connected to the receiving or transmitting station respectively, through cables by means of a mechanical, capacitive, or electronic switching facility.

In such antenna arrays where in most cases only one dipole at a time is operative, the other dipoles act as parasitic radiators and cause the radiation pattern of the operating dipole, which pattern is circular and should also be circular in Doppler navigation systems, to appear degenerated into a directive pattern which in practice even is of different shape for the individual dipoles of the array. This leads to an increase of the intrinsic errors in Doppler navigation systems.

This very disagreeable property of such antenna arrays for Doppler systems, particularly for direction finders is challenged by reducing the length of the individual dipoles, conventionally to half the wavelength, and by attenuating them through resistors, whereby impedance matching over a rather wide frequency band to the receiver input is achieved by suitable matching means (balance-to-unbalance transformer, F. Steiner, German Patent No. 1,106,819, corresponding British Patent No. 845,352, granted Dec. 7, 1960). The aforementioned drawbacks can be eliminated to a far-reaching extent by these measures, but a loss in sensitivity occurs for such dipoles as compared with dipoles of the conventional length of $\lambda/2$ (where $\lambda$=operating wavelength), which loss cannot be compensated for under certain circumstances even by a better sensitivity of the cooperating receiver.

The invention refers to a dipole antenna including a balance-to-unbalance transformer to set up a linear or circular antenna array, consisting of a multitude of such dipole antennae for a Doppler-radio navigation system in which the motion of an individual dipole is simulated by a successive, cyclical connection of the individual dipoles to the system, in order to produce the Doppler-effect. To reduce the mutual interference of the operative antenna and the non-connected or passive antennae, according to the invention, each half of the dipole is subdivided into several parts, the natural wavelengths of which are located far outside the operational frequency, and the parts are connected with one another by means of switching diodes, closed and opened by control voltages. According to a further embodiment of the invention each half of a dipole consists of three parts of which the ones located nearest to the feeder or to the tapping point (transformer) respectively are firmly coupled to each other. Between the exterior part of the dipole and that part near the transformer a switching diode is inserted, and between that one and the other part near the transformer a self-inducting coil is inserted which coil is of such an inductive value that it represents a parallel-resonant circuit for the operating frequency, together with the respective capacity of the diode, in its open or non-conductive condition (cutoff capacity). Between the other ends of the dipole parts near the transformer and the ends of the secondary winding of the transformer diodes are inserted, and self-induction coils are connected to the ends of the dipole parts near the transformer, the free ends of said coils being connected to each other. At that point the control voltage for the switching diodes is fed in.

The invention is particularly economical, if the individual antenna of the antenna array are connected to the receiver or the transmitter respectively by means of an electronic switching device, because the pulse generators, necessary to control the connections, must be provided, and the pulses can also be used to control the diodes connecting the individual parts of the dipoles.

The invention is now explained in detail with the aid of the accompanying drawings, wherein.

Figure 1:
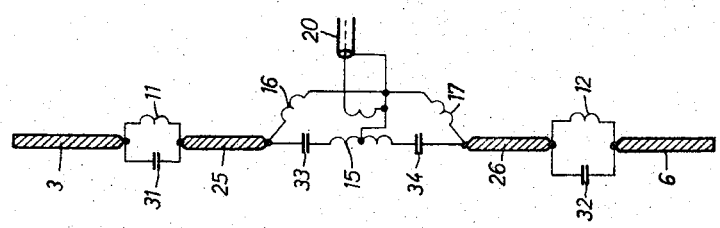
FIGURE 1 shows the diagrammatic construction of a dipole.
Figure 4:
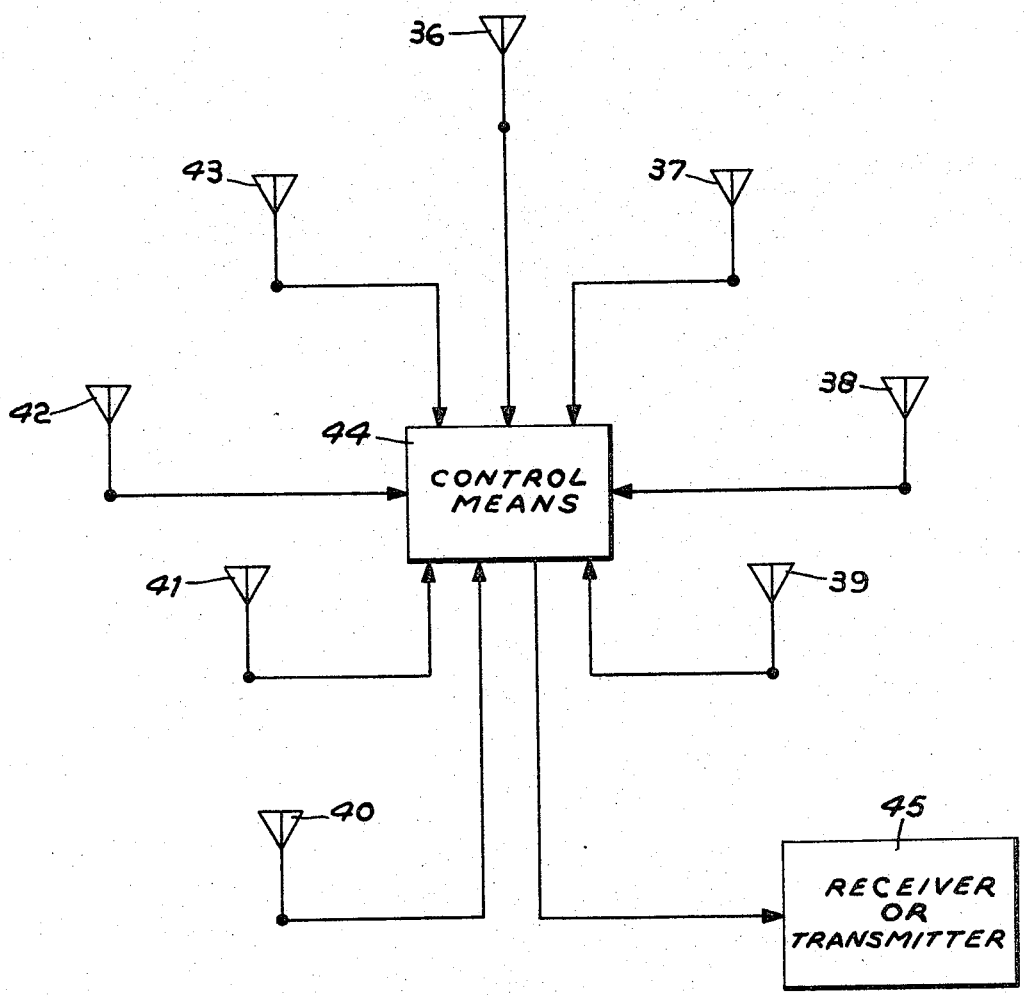
FIGURE 4 illustrates an antenna array utilizing antennae according to the invention.

Referring to FIGURE 4, there is illustrated a typical antenna array comprising antennas 36–43, each of which are of the type illustrated in detail in FIGURE 1. Each antenna is coupled to control means 44 which in turn is coupled to an appropriate receiver 45. It is clear that if the array is used for transmitting, then block 45 would represent a transmitter. Control means 44 provides the antennas 36–43 with the appropriate control voltages for activating and deactivating them according to the invention and also feeds the R.F. energy from receiver 45 to the proper antenna in the array at the appropriate time. The design of the control means 44 is straightforward and should be obvious to one ordinarily skilled in the art.

According to FIG. 1 both dipole halves 1 and 2, each of $\lambda/4$ electrical wavelength, are subdivided into three parts 3, 4, 5 and 6, 7, 8 respectively. The parts 3 and 6 are connected with parts 4 and 7 by means of diodes 9 and 10, and with the parts 5 and 8 by means of the self-induction coils 11 and 12. The parts 4 and 5 or 7 and 8 respectively are capacitively coupled to each other. These parts 4 and 5 or 7 and 8 respectively can be made in the printed-circuit technique, so that they form the metallic layers on either side of a thin insulating plate. But there are other constructions possible, e.g. parallel wires with coupling capacitors, or a concentrical design. Diodes 13 and 14 respectively are connected to the points of the dipole parts 4 and 7 near the transformer 15, and self-induction coils 16 and 17 respectively are connected to the respective points of the dipole parts 5 and 8. The free ends of the diodes 13 and 14 are connected with both ends of the secondary winding of transformer 15 which is a balance-to-unbalance transformer of a construction known per se, whereas the other ends of the self-induction coils 16 and 17 are connected to each other. The connection leads to a point S to which the control voltages for the diodes 9, 10, 13 and 14 are applied. The control voltages are produced, for example, by means of switch 35 and battery V which are coupled to point S. It is apparent that many other alternative arrangements for providing the required control voltages to the antenna may be devised by one ordinarily skilled in the art within the spirit of this invention. One end of the primary winding of the transformer 15 is connected to the internal conductor of a coaxial cable 20 through which the radio frequency is taken off or fed in respectively, and the other end of the winding is connected with the external conductor of the coaxial cable 20 and grounded. The secondary winding 21 of the transformer 15 has a center tapping, which is also grounded. Between point S and ground a capacitor 22 is inserted which serves to ground probably existing radio-frequency voltage, which may be present on the line between 16 and 17.

Figure 2:
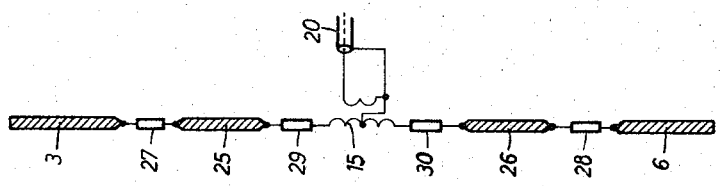
FIGURE 2 shows the functional conditions of the dipole with conductive diodes with the application of positive control voltage.

If now a positive control voltage is applied to point S of the arrangement, said voltage reaches the diode 9 over the induction coil 16, the dipole part 5 and the induction coil 11. This positive control voltage also is fed to the diode 13 via the dipole part 4, and via one-half of the secondary winding of the transformer 15 to ground. Also in the other direction it is fed via the induction coil 12 to the diode 10 and, via the dipole part 7 to diode 14 and via the other half of the secondary winding of the transformer 15 to ground. The switching diodes 9, 10, 13 and 14 are polarized in such a way that they become conductive when a positive control voltage is applied to point S. In this condition, i.e. conductive, the diodes represent a resistance route ($R_9$ to $R_{14}$). This can be represented by the functional diagram shown in FIG. 2. Due to the very firm coupling the dipole parts 4 and 5 or 7 and 8 appear as single dipole parts 25 and 26 with regard to the radio frequency. These dipole parts 25 and 26 are connected with the dipole parts 3 or 6 respectively via the resistances 27 and 28 respectively, represented by the diodes 9 and 10 respectively, which are made conductive by the positive control voltages, and connected with the ends of the secondary winding of the transformer 15 via the resistances 29 and 30 respectively, represented by the diodes 13 and 14 respectively in the conductive condition. Thereby a dipole loaded with those resistances is obtained which possesses an electrical length of $\lambda/2$ in total.

Figure 3:
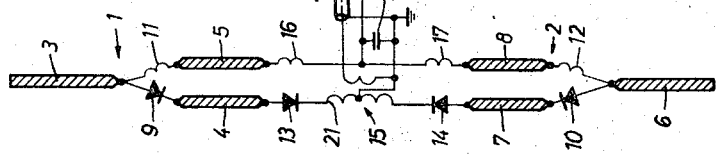
FIGURE 3 shows the functional condition of the dipole with cutoff diodes with the application of a negative control voltage.

When a negative control voltage is applied to point S, all diodes 9, 10, 13 and 14 are cut off and represent a capacitance. This results in the functional diagram shown in FIG. 3. The capacitances of the diodes 9 and 10 (31 and 32) form parallel-resonant circuits together with the induction coils 11 and 12 respectively, which represent a very high resistance at the operating frequency, whereby the dipole parts 3 or 6 respectively, appear to be completely separated from the dipole parts 4 and 5 or 7 and 8 respectively. The capacitances 33 and 34 form, together with the self-induction coils 16 and 17 respectively and parts of the secondary winding of the transformer 15, parallel-resonant circuits, so that the respective dipole halves are also separated from the transformer 15. Thus, the entire dipole is subdivided into four approximately $\lambda/8$-long parts which, in turn, ensures that a coupling effect of the passive dipoles of the antenna array on the operative dipole is avoided to a far-reaching extent.

The control voltage for the switching diodes can also be fed to the arrangement over a hybrid and over the coaxial cable for the feeding and grounding of the RF energy, instead of over a separate control line at point S.

While I have described above the principles of my invention in connection with specific apparatus, it is to be clearly understood that this description is made only by way of example and not as a limitation to the scope of my invention as set forth in the objects thereof and in the accompanying claims.

I claim:
1. A dipole antenna arrangement for systems utilizing antenna arrays wherein the motion of an individual dipole antenna of said array is simulated by a successive and cyclical connection of the individual dipole antennas of said array, each said dipole antenna comprising:
   a plurality of dipole elements;
   first coupling means for coupling said dipole elements together, said first coupling means including:
      a plurality of reactive elements; and
      switching means including a plurality of unidirectional current conducting elements coupled to said reactive elements, which unidirectional current conducting elements provide a reactance in their non-conducting states which resonates with said reactive elements at the operating frequency of the antenna;
   second coupling means for coupling radio frequency energy to said dipole antenna; and
   a source of control voltage connected to said second coupling means for alternately switching said switching means to its conducting state to couple said dipole antenna elements together to form a dipole antenna from its non-conducting state in which the reactance of said unidirectional current conducting elements resonates with said plurality of reactive elements at the operating frequency of the antenna to effectively decouple said dipole elements.

2. A dipole antenna arrangement according to claim 1 wherein said second coupling means comprises a balance-to-unbalance transformer.

3. A dipole antenna arrangement for systems utilizing antenna arrays wherein the motion of an individual dipole antenna of said array is simulated by a successive and cyclical connection of the individual dipole antennas of said array, each said dipole antenna comprising:
   a plurality of dipole elements, each half of said dipole antenna including three of said dipole elements;
   switching means;
   means including said switching means for coupling two dipole elements of said each half in parallel;
   means including said switching means for coupling the third dipole element of said each half in series with said respective two parallel coupled dipole elements;
   means including said switching means for selectively coupling said dipole elements together to form a dipole antenna;
   means coupled to said dipole antenna for coupling radio frequency energy thereto; and
   a source of control voltage coupled to said radio frequency coupling means for selectively operating said switching means.

4. A dipole antenna arrangement according to claim 3 wherein said radio frequency coupling means comprises a balance-to-unbalance transformer.

5. A dipole antenna arrangement according to claim 4 wherein said switching means includes a first diode coupling one of said two dipole elements to said third dipole element and further comprising a first inductor coupling the other of said two elements to said third dipole element.

6. A dipole antenna arrangement according to claim 5 further comprising:
   a second inductor coupled to the other end of said other of said two dipoled elements;
   a capacitor coupling said second inductor to ground potential; and
   means coupling said source of control voltage to the junction of said capacitor and second inductor;
   said switching means further including a second diode coupling said one element of said two dipole elements to the secondary winding of said balance-to-unbalance transformer.

7. A dipole antenna arrangement according to claim 6 wherein said secondary winding is center tapped, said center tap being coupled to ground potential and wherein the primary winding of said transformer couples radio frequency energy to said antenna.

8. A dipole antenna arrangement comprising:
   first, second and third dipole elements;
   a first inductor coupling said first dipole element to said second dipole element;
   a first diode coupling said first dipole element to said third dipole element;
   a balance-to-unbalance transformer;
   a second diode coupling said third dipole element to the secondary winding of said transformer;

fourth, fifth and sixth dipole elements;
a second inductor coupling said fourth dipole element to said fifth dipole element;
a third diode coupling said fourth dipole element to said sixth dipole element;
a fourth diode coupling said sixth dipole element to the secondary winding of said transformer;
a third inductor coupled to the other end of said second dipole element;
a fourth inductor coupling said fifth dipole element to the other end of said third inductor;
a capacitor coupled between the junction of said third and fourth inductors and ground potential;
a source of control voltage coupled to the junction of said third and fourth inductors; and
means for feeding radio frequency energy to the primary winding of said transformer.

References Cited

UNITED STATES PATENTS

| | | | |
|---|---|---|---|
| 2,210,666 | 8/1940 | Herzog | 343—701 X |
| 2,709,219 | 5/1955 | Schmidt | 343—859 X |

HERMAN KARL SAALBACH, *Primary Examiner.*

R. D. COHN, S. CHATMON, JR., *Assistant Examiners.*